4,543,034

United States Patent [19]
Blatt et al.

[11] Patent Number: 4,543,034
[45] Date of Patent: Sep. 24, 1985

[54] LINEAR TRANSFER STROKING BOOM

[75] Inventors: Leland F. Blatt, Grosse Pointe Shores, Mich.; L. Douglas Blatt, 31915 Groesbeck Hwy., Fraser, Mich. 48026

[73] Assignee: L. Douglas Blatt, Grosse Point Farms, Mich.

[21] Appl. No.: 594,342

[22] Filed: Mar. 29, 1984

[51] Int. Cl.$^4$ .............................................. B23Q 7/04
[52] U.S. Cl. ...................................... 414/752; 901/22; 92/161
[58] Field of Search ........................ 414/749, 751–753; 92/161, 165 PR; 901/22, 40; 198/486

[56] References Cited
U.S. PATENT DOCUMENTS 3,648,854 3/1972 Potter .................................... 414/751
3,734,303 5/1973 Blatt .................................... 414/753

FOREIGN PATENT DOCUMENTS 2403873 4/1979 France ............................... 901/22 X

*Primary Examiner*—Terrance L. Siemens
*Attorney, Agent, or Firm*—Cullen, Sloman, Cantor, Grauer, Scott & Rutherford

[57] ABSTRACT

A linear transfer stroking boom has a housing suspended from a support which may be the travel carriage of an overlying longitudinally reciprocal shuttle. A cylinder assembly is mounted within the housing and includes a reciprocal piston rod on a longitudinal axis. A plurality of parallel spaced guide rods are slidably mounted upon and extend through the ends of the housing and outwardly thereof. Boom mount plates span the ends of the guide rods with the piston rod secured to one boom mount plate. A pair of parallel spaced boom extension arms are removably mounted upon the boom mount plates and extend forwardly of the housing. A workpiece gripping assembly spans and depends from the free ends of the boom arms. Reciprocal movement of the piston rod effects corresponding longitudinal movements of the boom arms in the same direction as and simultaneously with feed corresponding movements of the travel carriage.

17 Claims, 4 Drawing Figures

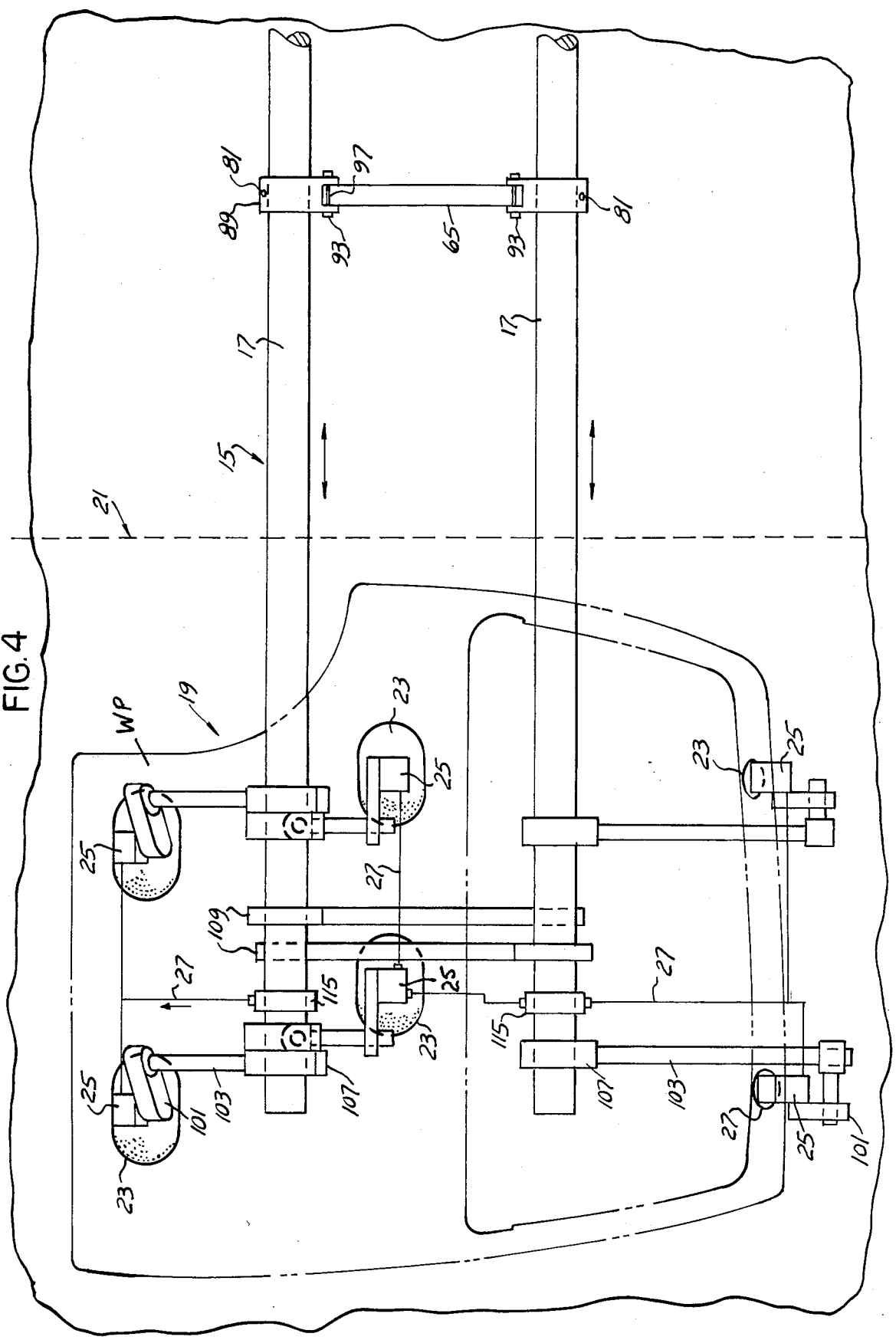

LINEAR TRANSFER STROKING BOOM

BACKGROUND OF THE INVENTION

Heretofore, transfer and shuttle devices have included travel carriages mounting workpiece gripper assemblies for transporting a workpiece to the bed of a press for loading or unloading such workpiece into or out of a work station in automation system. This is for the transfer of sheet metal panels, for example, into and out of stamping presses or welding stations. Large presses are generally positioned, spaced and aligned to allow the workpiece to progress in a straight line from press to press having successive operations i.e., forming, trimming, piercing, performed in order that the workpiece moves through the line to a greater state of completion.

Since these presses are often placed fairly close together, and are not readily movable, it is necessary that the travel carriage of the shuttle device move a sufficient distance from the center of one press to the center of another press. Difficulties have been encountered in providing a travel carriage which will move the workpiece prescribed distances and which will do so within a reasonable time period.

THE PRIOR ART

Examples of cylinder operated feed and related mechanisms are set forth in one or more of the following United States patents of Leland F. Blatt.

| 3,371,583 | March 5, 1968, | Material Handling Device Actuator With Guide Rods |
| 3,568,959 | March 9, 1971 | Vacuum Cup Work Gripper |
| 3,665,771 | May 30, 1972 | Retraction Mechanism for Shuttle Carriage |
| 3,734,303 | May 22, 1973 | Travel Cylinder and Gripper Actuator with Triple Guide Rods |

SUMMARY OF THE INVENTION

It is an important feature of the present invention to provide a linear transfer device normally attached to and suspended from the travel carriage of a larger transfer or shuttle device, mounting a pair of stroking booms which project forwardly and at their ends having suspended therefrom vacuum cups or workpiece grippers for grasping and holding a workpiece during transfer to and from a press, welding machine or other tool.

An important feature is to provide a stroking boom device which is coupled to an overlying reciprocating travel unit with the stroking boom moving simultaneously with the travel carriage of the overlying shuttle for loading or unloading a workpiece into or out of a work station corresponding to the bed of a press or other tool.

As a further feature the feed motion of the travel carriage and linear transfer device are simultaneous and in the same direction, and thus can operate in much less linear space than the total travel stroke required between the beds of adjacent presses, between which the work is transferred and wherein the travel carriage is stack mounted above the linear transfer device.

A further feature includes a pair of elongated opposed parallel quick change boom arms which are removably mounted and secured to the linear transfer device wherein the boom arms at their ends carry depending vacuum cups for other gripper devices for grasping and holding a workpiece during transfer to a work area or between work areas.

As a further feature the boom arms which are custom fitted for various parts or workpieces, are readily removable and interchangeable to facilitate quick changeovers from one set of boom arms to another.

A further feature is the solution of the above problem by attaching the stroking boom device to the travel carriage of a larger horizontally reciprocal and overlying shuttle device. This increases the effective travel stroke of the master shuttle by the stroke length of the stroking boom.

A further feature is the simultaneous operation and feeding of the shuttle and stroking boom in the same direction and simultaneously so that they can both travel to and from the work station reducing the cycle time.

A further object of the present invention is to provide an improved guide rod assembly mounted upon the cylinder housing which is suspended from a support which is preferably longitudinally adjustable, and wherein boom mount plates are secured to opposite ends of the guide rods and connected to a reciprocal piston rod for effecting reciprocal movements thereof. The boom mount plates have connected at their outer ends and coplanar therewith boom mount brackets which may be removably and interlockingly mounted upon the outer ends of the boom mount plates for supporting elongated boom arms upon opposite sides of the housing. The one ends thereof project forwardly and mount a depending workpiece gripper assembly for transporting a workpiece into the work area of a press or between work areas of adjacent presses or tools.

These and other objects and features will be seen from the following Specification and claims in conjunction with the appended drawings.

THE DRAWINGS

FIG. 4 is a fragmentary plan view as a partial extension on a reduced scale of FIG. 2, showing the free end portions of the boom arms and the depending workpiece gripper assemblies.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Figure 1:
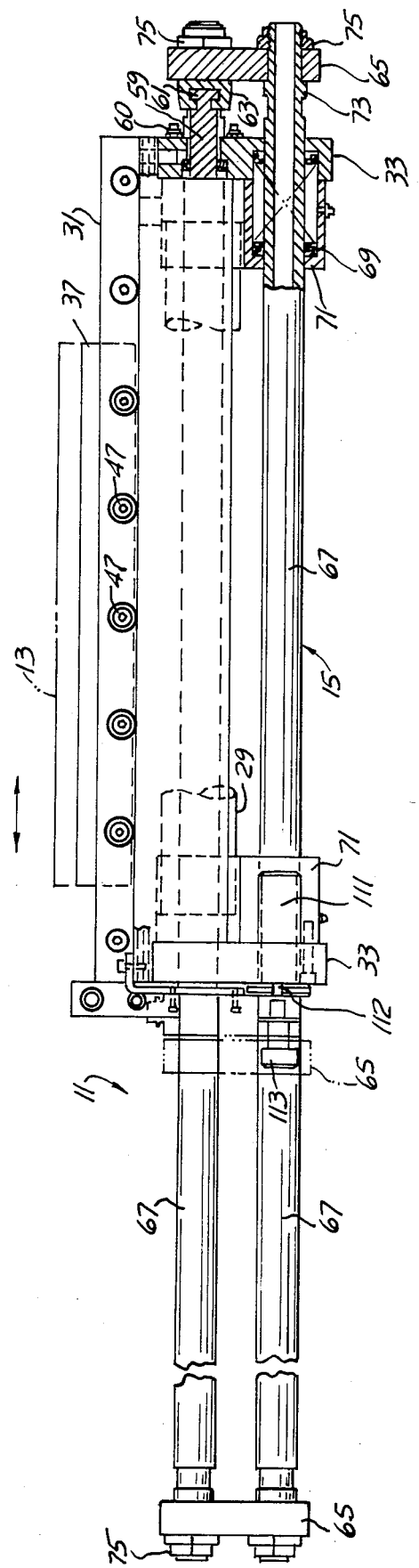
FIG. 1 is a fragmentary partly sectioned side elevational view of the present linear transverse device with an overlying longitudinally reciprocal support therefore with the boom arms omitted.
Figure 2:
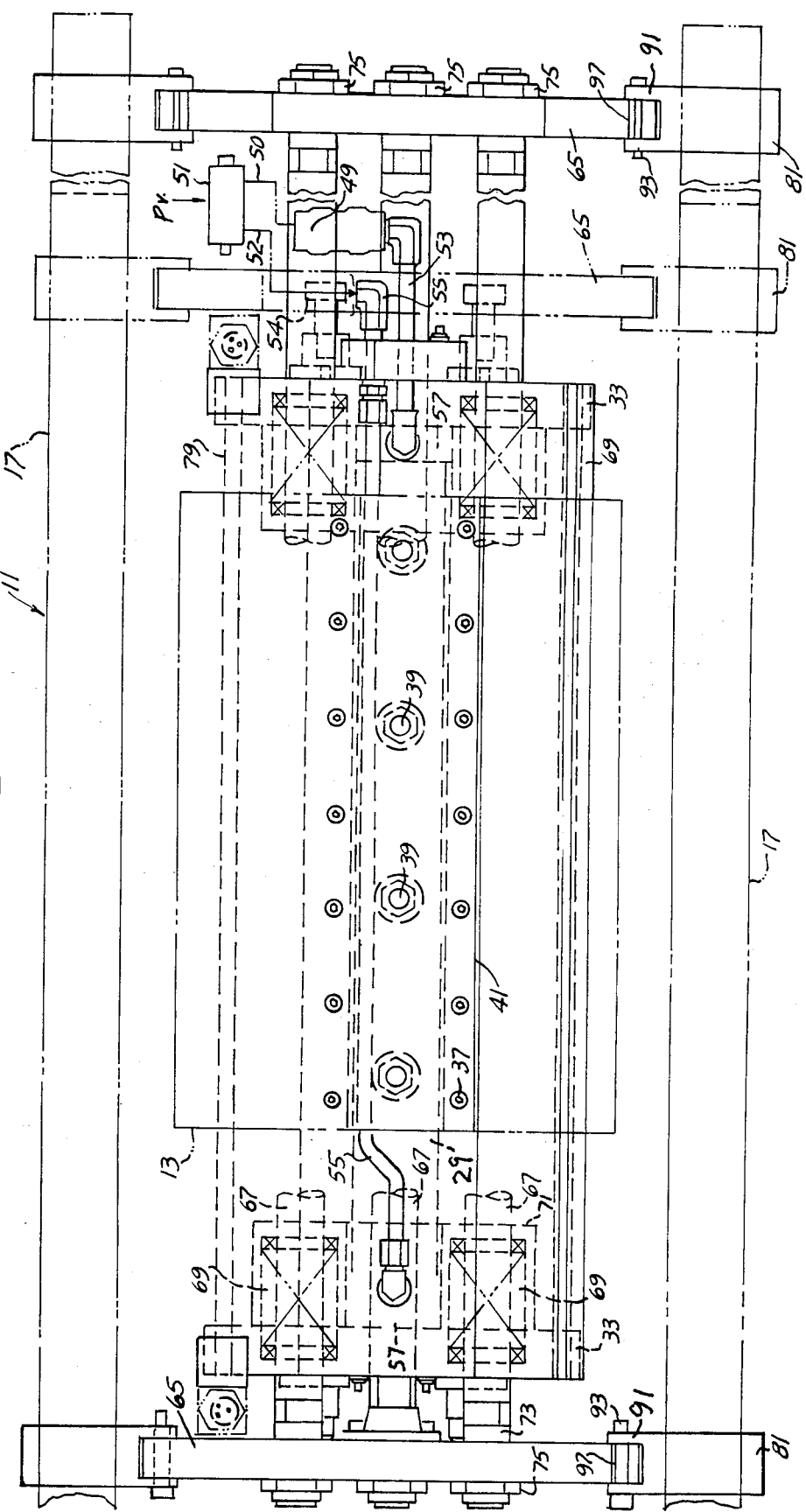
FIG. 2 is a plan view there of with a pair of boom arms fragmentarily shown, mounted thereon and adapted for projection forwardly thereof.

The present linear transfer device is generally indicated at 11, FIGS. 1 and 2 and has a support 13 which may be the travel carriage of a larger shuttle carriage or shuttle device or other travel unit. An example of such shuttle travel unit is shown in one or more of the following U.S. Pat. No. 3,371,583 entitled Material Handling Device Actuator with Guide Rods, and U.S. Pat. No. 3,665,771 entitled Retractor Mechanism for Shuttle Carriage.

The present linear transfer device 11 is suitably supported upon and adjustably suspended from the travel carriage 13 of such shuttle device and includes a longitudinal reciprocal stroking boom 15, FIG. 4. Said boom includes a pair of opposed parallel quick change boom arms 17. These are mounted upon and form a part of the linear transfer device shown broken off in FIG. 2 and with an extension of said plan view and on a reduced scale fragmentarily shown in FIG. 4. Outer end portions of the quick change arms 17 overlie the bed or work station 19 of press 21 or stamping or welding station.

In FIG. 4, there is shown a workpiece gripper assembly which spans and depends from the ends of the boom arms 17. The workpiece gripper assembly includes a plurality of spaced vacuum cups 23 depending from venturi vacuum assemblies 25. Pressurized air is delivered thereto through the corresponding air conduits 27 communicated thereto through the elongated boom arms 17, as schematically shown.

An illustration of the structure, function and operation of the vaccum cups workpiece grippers is found in U.S. Pat. No. 3,568,959 wherein pressurized air is delivered to the venturi assemblies 25 connected to the vacuum cups for creating a vacuum condition within cups 25 for anchoring and supporting workpiece WP, FIG. 4.

To the extent that an understanding of the function and operation of such vacuum cups is required, the disclosure in U.S. Pat. No. 3,568,959 is incorporated hereinto by reference. The specific details of the vacuum cups 23 and their mode of operation are not required for an understanding of the present invention.

It is contemplated that as equivalent to a plurality of variably spaced venturi operated vacuum cups 23, the workpiece gripper assembly may include a plurality of workpiece grippers which are adapted to support a workpiece such as the sheet metal plate WP, FIG. 4, for transporting said workpiece to the bed or workstation 19 of a press 21 for transporting such workpiece between presses or other tools.

The present linear transfer device includes a cylinder assembly which may be hydraulic or pneumatic. The cylinder assembly includes an elongated cylinder 29, FIG. 1, nested within elongated housing or body 31 and supported upon transverse end plates 33 forming a part of said housing.

Figure 3:
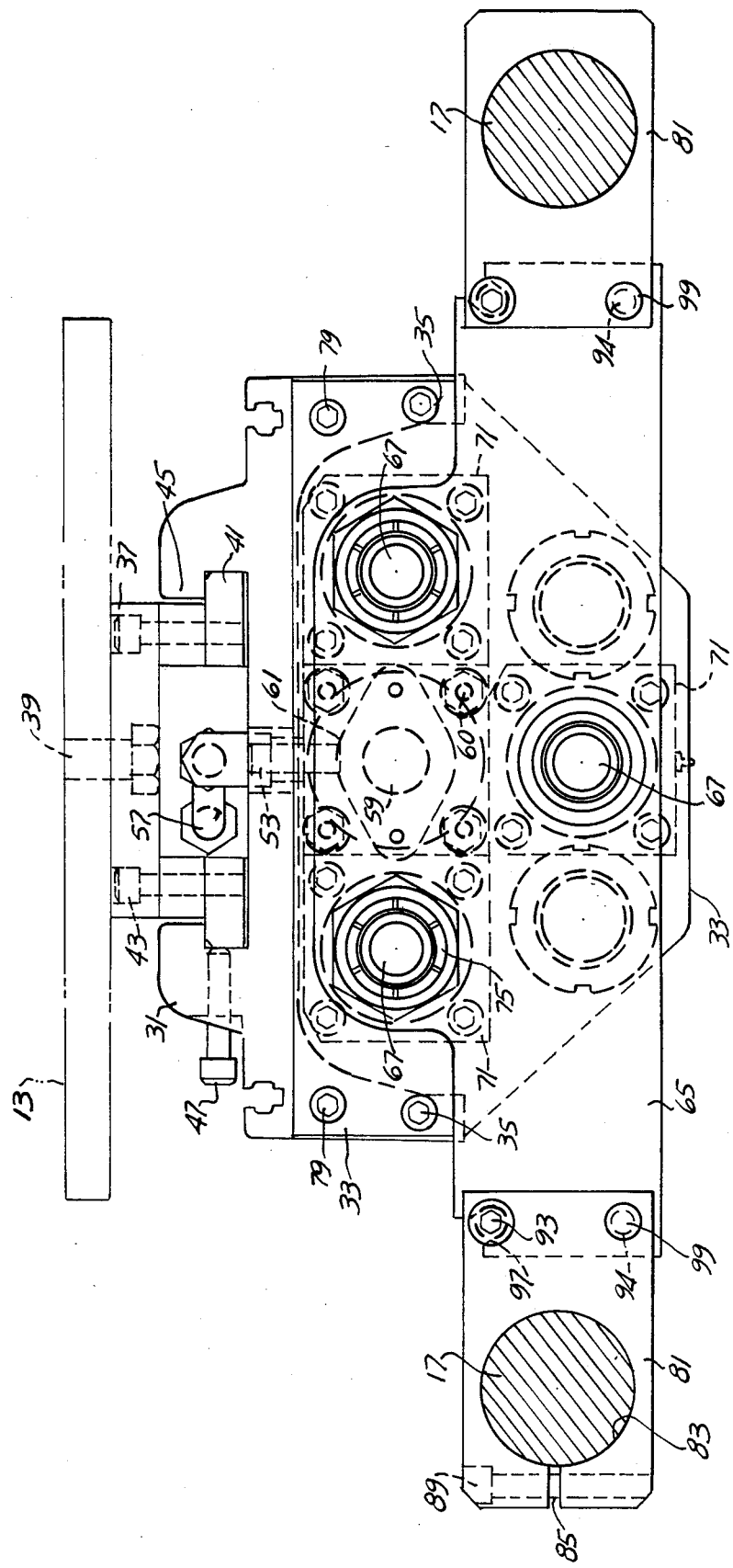
FIG. 3 is a right side elevational view thereof on an increased scale.

As schematically shown in FIGS. 1, 2 and 3, the support for the housing 31 is generally indicated at 13, may be stationary. In the preferred embodiment said support corresponds to a travel carriage of an overlying larger transfer shuttle device, not shown in the drawing, but of the type disclosed in U.S. Pat. Nos. 3,371,583, 3,665,771 and 3,734,303.

For the purpose of the present application, the support 13 is in nature of a longitudinally reciprocal power operated support carriage plate adapted for power operated reciprocal movement as indicated by the arrow in FIG. 1. Centrally underlying the carriage plate 13 is a depending mount bracket 37, FIGS. 1 and 3, which is secured thereto by a plurality of longitudinally spaced fasteners 39, FIGS. 2 and 3. The elongated side plate 41 underlies and extends along the length of bracket 37 and is spaced below travel carriage or plate 13. Said slide plate is secured to mount bracket 37 by a plurality of fasteners 43.

The supporting of housing 31 from and depending from the longitudinally reciprocal carriage or support 13 includes formed upon and along the length of housing 31 a pair of elongated opposed undercut or slotted mount gibs 45. Said gibs receive the opposite longitudinal edges of slide plate 41. The slide plate may be longitudinally adjusted with respect to housing 31 and secured thereto by a series of laterally spaced lock screws 47, FIG. 3.

As schematically shown in FIG. 2, the flow control pressure fitting 49 is connected by conduit 50 in one of the cylinder ports upon the four way control valve 51. Said fitting is adapted to receive pressure fluids, such as compressed air or pressurized liquid from an exteriorly pressurized source. Conduit 52 interconnects another cylinder port of valve 51 with pressure fitting 54. The respective pressure fittings 49 and 54 are connected to cylinder ports at opposite ends of the cylinder within the corresponding cylinder heads 57 by pipes 53 and 55. Said cylinder heads are secured upon the interior of housing end plates 33 and interconnected by corresponding tie rods 60.

The reciprocal piston rod 59 of cylinder assembly projects rearwardly from one end of cylinder 29 through one end plate 33 and outwardly thereof and terminates in the T-shaped rod end 61. As shown in FIG. 1, the rod end 61 is interlocked within a corresponding T-shaped recess within the T slot bracket 63 mounted upon and secured to the adjacent outwardly spaced boom mount plate 65.

A plurality of travel guide rods 67, of which there are three, in the illustrative embodiment are arranged on both sides of the central longitudinal axis of cylinder 29 and spaced below said cylinder, FIG. 3. Said rods extend through the corresponding end plates 33 of said housing and outwardly thereof.

A plurality of longitudinally spaced ball bushings 69 within corresponding housings 71 receive portions of the respective guide rods 67 and are mounted upon and secured to the corresponding end plates 33, FIGS. 1, 2 and 3.

Each of the guide rods or tubes 67 have a shoulder 73 adjacent their ends and a threaded portion which is projected outwardly through the corresponding boom mount plate 64 and are secured thereto by the fasteners 75. The opposed pair of spaced tie rods or tubes 79 at their ends are secured to and interconnect the corresponding end plates 33 of body 31. Removably supported upon the ends of the boom mount plates 65 and in alignment therewith are longitudinally spaced boom mount brackets 81, FIGS. 2 and 3, having a transverse bore 83 therethrough, which in the illustrative embodiment is circular to correspond to the cross-sectional shape of the boom arms 17. These could be any other cross-sectional shape, such as square, to receive a boom arm of such shape.

The respective bracket apertures 83 upon one side terminate in the split portions 85 and receive the fastener 89 which functions as crimp blocks for securing portions of the boom extension arms 17 within the corresponding longitudinally aligned mount brackets 81.

Each of the respective boom mount brackets 81 have upon one side an upright slotted portion 91, FIG. 2, which is positioned over the corresponding end of the adjacent boom mount plate 65. Fastener 93, or shoulder screw spans upper end portions of the slotted member 91 and is nested within the upwardly and outwardly extending angle slot 97 formed in the outer ends of each boom mount plate 65, FIG. 3.

In the assembly of the corresponding boom arm 17 and the longitudinally spaced mount brackets 81 secured thereon, the corresponding fasteners 93 are hooked over and positioned within the slots 97, by which the brackets are suspended from mount plate 65. With the brackets 81 and connected boom arm 17 rotated so as to be in longitudinal alignment with boom mount plate 65, a detent pin 99 is projected through a corresponding bushing 94 within a transverse bore through plate 65 for anchoring and securing the bracket 81 in the support position shown in FIG. 3.

After the detent pin 99 has been assembled, the shoulder screw fastener 93 is tightened. Thus at any time and for a particular job, should it be desired to remove and replace the boom arms 17, which are preferably constructed with aluminum, all that is necessary is the loosening of the fasteners 93, removal of the detent pins 99, after which either the left hand or the right hand boom arm and connected mount brackets 81 is pivoted and unhooked or dissassembled from the adjacent boom mount plate 65. Thus, there can be quick change replacement of a boom arm for a particular job, wherein the required support bracket 81 is already secured to the corresponding boom arm. The channel portion 91 of the bracket 81 is positioned over the end of the corresponding boom mount plate. Fastener 97 is nested in and hooked over into slot 97 of the corresponding boom mount plate 65, as for example the left handed assembly, FIG. 3. Thereafter detent pin 99 are projected into position and successively the fasteners 93 tightened.

In the illustrative embodiment, the right and left hand boom arms 17 shown in FIG. 2 as broken off, actually extend forwardly of front boom mount plate 65 parallel to the central longitudinal axis of cylinder 29, FIG. 4.

Spanning and depending from the free ends of the boom arms 17, or the articulated support arms 101 which are connected to corresponding venturi assemblies 25 from which depend the suction cups 23. Angularly adjustable support arms 101 at their upper ends are adjustably connected to the transverse shafts 103 which are adjustably secured by clamp collars 107 to portions of the boom rods 17.

In the illustrative embodiment, there are a plurality of laterally and longitudinally spaced suction cup assemblies 23 with associated articulated support arms and venturi controls for the vacuum cups suspended from the boom arms 17 adapted for retaining and supporting engagement with a workpiece WP.

The suction cups 23 or other workpiece gripper assembly depend from the free ends of boom arms 17. These are interconnected by a pair of transverse spacer plates 109, FIG. 4, and are adapted to support the workpiece and to position the workpiece with respect to a bed or work station 19 of a press or welding station 21. Pressurized air is delivered through the boom arms 17 and by suitable fittings 115 connected to air conduits 27 to the venturis 25.

There is schematically shown in FIG. 1, mounted upon an end plate 33, a conventional shock absorber assembly 111 having a yieldable member 112. A suitable contact member 113 is secured to forward boom mount plate 65 so as to limit retraction thereof with respect to housing 31. The structure, function and operation of the shock absorber forms no part of the present invention and therefore a detailed description thereof is omitted.

The coupling of the present stroking boom device 11, 15, to another reciprocating travel unit, such as the travel carriage plate 13, of an overlying shuttle assembly, enables the present linear transfer device to load or unload a workpiece into and out of a work station faster, because the travel motion of both units can be actuated simultaneously. Further they can operate in much less linear space than the total travel stroke required, because the units are stacked and mounted one above the other.

The quick change boom arms 17 and associated mount brackets 81 provide a means for removably positioning the boom arms 17 upon opposite sides of housing 31 and for securing to the corresponding boom mount plates 65. This provides for quick change or replacement as desired. The respective quick change boom arms at their free ends, FIG. 4, carry vacuum cups 23 or gripper devices to grasp and to hold a workpiece during transfer.

These arms are custom fit to various parts or workpieces and are readily changeable for a quick changeover.

Since the travel stroke required for moving a workpiece from the center of one press bed to the center of the next press bed is often far greater than the spacing between the presses themselves, this problem is solved by attaching the present stroking boom device to the travel carriage of a larger horizontal shuttle assembly whose carriage is designated at 13, FIG. 1. This increases the effective travel stroke of the stroking boom device. Because both of the shuttle and stroking boom can be actuated simultaneously, they can both travel in the same direction to and from the work station at the same time and thus, the required cycle time is greatly reduced.

Having described my invention, reference should now be had to the following claims:

We claim:

1. A linear transfer stroking boom comprising an elongated housing having a longitudinal axis suspended from a support and having spaced end plates;
an elongated cylinder assembly within said housing mounted upon said end plates including a reciprocal piston rod on said axis movable through one of said end plates;
a plurality of spaced guide rods parallel to said axis extending through said housing slidably mounted upon said end plates and extending outwardly thereof;
a pair of upright boom mount plates outwardly of said end plates spanning and receiving the ends of said guide rods and secured thereto;
said piston rod being connected to one of said boom mount plates, whereby reciprocal movements of said piston rod effects reciprocal movements of said guide rods and boom mount plates relative to said housing;
apertured longitudinally spaced aligned boom mount brackets removably mounted upon and aligned with the ends of said boom mount plates respectively and secured thereto;
a pair of parallel boom extension arms extending through aligned boom mount brackets and secured thereto and extending forwardly of one of said boom mount plates;
and a workpiece gripper assembly spanning and depending from the free ends of said boom arms.

2. In the transfer boom of claim 1, there being at least a pair of said guide rods spaced upon opposite sides of said axis.

3. In the transfer boom of claim 2, a third guide rod spaced below said cylinder.

4. In the transfer boom of claim 1, said boom mount plates being parallel to said housing end plates.

5. In the transfer boom of claim 1, there being a front and a rear boom mount plate, said piston rod being connected to said rear mount plate.

6. In the transfer boom of claim 1, the connection of said piston rod to a boom mount plate including a bracket secured to said boom mount plate having a T slot therein, said piston rod having a rod end of T-shape positioned within said T slot.

7. In the transfer boom of claim 1, the mounting of said guide rods including longitudinally spaced ball bushings mounted on said end plates receiving said guide rods respectively.

8. In the transfer boom of claim 1, the securing of said guide rods to said boom mount plates including threaded ends upon said guide rods projected through said end plates respectively;

said fasteners threaded over said guide rod ends and bearing against said boom mount plates.

9. In the transfer boom of claim 1, the mounting of each boom mount bracket including an upright slotted portion in said bracket receiving and positioning over the corresponding end of a boom mount plate;

a fastener spanning the upper end of said slotted portion nested supported and hooked within an upwardly opening slot in said boom mount plate;

and a removable detent pin extending through the bottom of said slotted portion and through said boom mount plate.

10. In the transfer boom of claim 9, the slots at the ends of said boom mount plates being inclined outwardly, to facilitate dissassembly of said boom mount brackets and connected boom arm from said boom mount plates, when said detent pins have been removed.

11. In the transfer boom of claim 1, said boom mount brackets having an aperture therethrough of a shape corresponding to the cross-section of said boom arms;

said aperture terminating in a split portion at the outer side of said bracket;

and a fastener threaded into said split portion for securing said boom arm and its support brackets.

12. In the transfer boom of claim 1, said support being the travel carriage plate of an overlying shuttle longitudinally reciprocal upon an axis extending in the same direction as said housing axis;

the feed movements of said carriage in one direction being simultaneous with the feed movement of said boom arms, whereby the coupling of the linear transfer stroking boom to said overlying shuttle carriage plate enables the boom arms to load and unload a workpiece into and out of a work station faster.

13. In the transfer boom of claim 12, an elongated slide plate parallel to and depending from said carriage plate;

there being a pair of undercut opposed gibs in the top of said housing along its length cooperatively receiving said slide plate;

and fasteners upon said housing retainingly engageable with said slide plate for adjustably securing a side plate selectively along the length of said housing.

14. In the transfer boom of claim 1, said workpiece gripper assembly including a plurality of spaced vacuum cups adapted for operative retaining engagement with a workpiece.

15. In the transfer boom of claim 1, said workpiece gripper assembly including a plurality of spaced workpiece grippers adapted to grasp and hold a workpiece during transfer.

16. In the transfer boom of claim 1, said cylinder assembly including a cylinder having pressure ports at its opposite ends;

a four way valve connected to a fluid pressure source, and having a pair of cylinder ports connected to the opposite ends of said cylinder, selective control of said valve controlling reciprocal movements of said piston rod and connected boom arms.

17. In the transfer boom of claim 12, said linear stroking boom increasing the effective travel stroke of the overlying master shuttle by the stroke length of said boom arms, and being simultaneous with movements of the carriage cycle time is reduced.

* * * * *